United States Patent [19]

Sato

[11] Patent Number: 5,639,283
[45] Date of Patent: Jun. 17, 1997

[54] METHOD FOR PRODUCING A CYLINDRICAL BUFF

[75] Inventor: Takashi Sato, Tokyo, Japan

[73] Assignee: Kabushiki Kaisha Shoyo Seiki, Tokyo, Japan

[21] Appl. No.: 620,357

[22] Filed: Mar. 22, 1996

[30] Foreign Application Priority Data

Mar. 23, 1995 [JP] Japan .................................. 7-090298

[51] Int. Cl.⁶ .................................................. B24D 11/02
[52] U.S. Cl. ............................................... 51/293; 51/297
[58] Field of Search ........................ 51/293, 297; 451/1, 451/120, 158, 258

[56] References Cited

U.S. PATENT DOCUMENTS

| | | | |
|---|---|---|---|
| 3,750,272 | 8/1973 | Gomond | 29/558 |
| 3,943,666 | 3/1976 | Dion et al. | 451/28 |
| 4,179,852 | 12/1979 | Barnett | 451/63 |
| 4,271,639 | 6/1981 | Talalay et al. | 451/53 |
| 4,586,296 | 5/1986 | Saunders | 451/1 |
| 5,099,618 | 3/1992 | Schmid | 451/57 |
| 5,146,382 | 9/1992 | Yao-Ko | 360/137 |
| 5,524,313 | 6/1996 | Sato | 15/88.3 |

OTHER PUBLICATIONS

Patent Abstracts of Japan, vol. 016, No. 311 (M-1277), 8 Jul. 1992 & JP-A-04 087779 (Fujikoo:KK) 19 Mar. 1992. Abstract.

Patent Abstracts of Japan, vol. 018, No. 094 (M-1561), 16 Feb. 1994 & JP-A-05 301170 (Nippon Unit KK) 16 Nov. 1993. Abstract.

*Primary Examiner*—Deborah Jones
*Attorney, Agent, or Firm*—Nixon & Vanderhye

[57] ABSTRACT

Method for producing a cylindrical buff with an abrasive surface is disclosed. A plurality of circular buff material is stacked to form a cylindrical shape. The buff is soaked into a liquid and the liquid is frozen to harden a abrasive surface of the buff. The buff is rotated and the abrasive surface is cut by a cutting tool to smoothen the abrasive surface.

Another method for producing a cylindrical buff with an abrasive surface is also disclosed. A plurality of circular buff material is stacked to form a cylindrical shape. The buff is rotated and a liquid is jetted with high speed toward the abrasive surface of said buff to smoothen the abrasive surface.

8 Claims, 7 Drawing Sheets

METHOD FOR PRODUCING A CYLINDRICAL BUFF

BACKGROUND OF THE INVENTION

The invention relates to a method for producing a cylindrical buff having a smooth abrasive surface.

It is well known art to burnish the surface of a work for removing the protruding particles or high spots from the surface by using cylindrical buff which is driven to rotate and urged against the surface of the work. The work is for example, optical disc such as compact disc (CD) or Laser disk (LD.)

Figure 8:
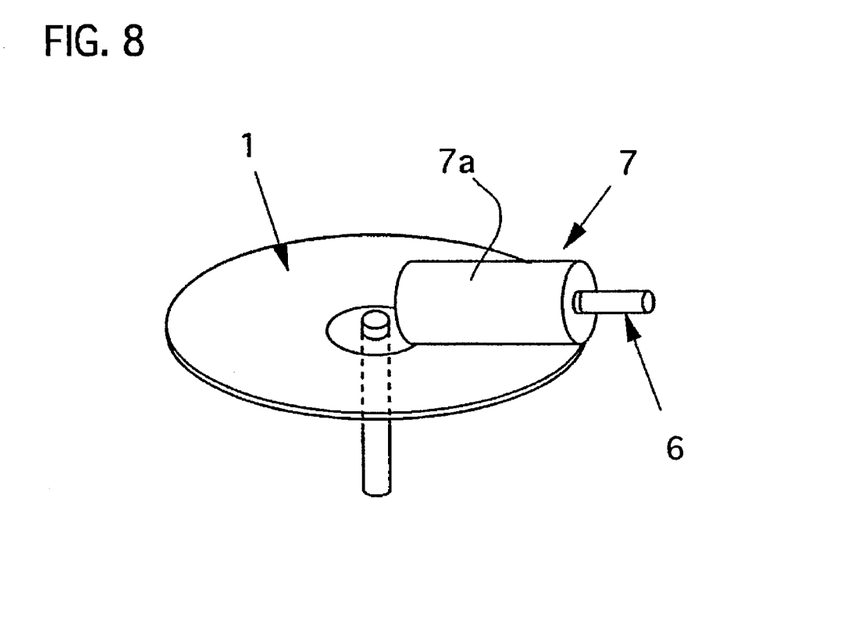
FIG. 8 is a perspective view showing a prior art of burnishing apparatus for burnishing a surface of the compact disc.

FIG. 8 shows a prior art of burnishing apparatus for burnishing optical disc such as compact disc 1. A cylindrical buff 7 is rotated by a drive shaft 6 which is connected to a drive source (not shown), an abrasive surface 7a of the buff 7 burnishes a reading surface of a compact disc 1. U.S. Pat. No. 5,524,313, applicant and assignee are same with the present application, discloses the burnishing apparatus of this type. U.S. Pat. No. 3,943,666, assigned to Dysan Corporation also discloses the burnishing apparatus of this type.

Figure 9:
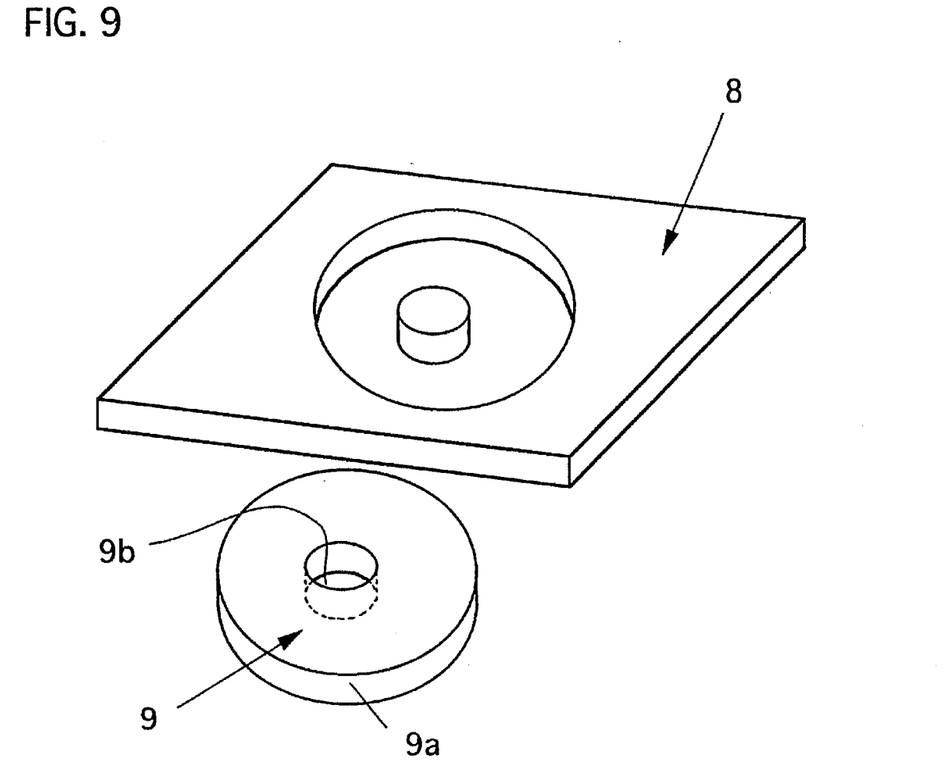
FIG. 9 is a perspective view showing the step of producing a circular buff material by blanking a sheet material.

Typically, the buff 7 is produced by the steps of blanking the sheet material 8 to form a circular buff material 9 as shown in FIG. 9, and stacking a plurality of circular buff material 9 to form cylindrical shaped buff. This art is briefly disclosed in the above-mentioned U.S. Pat. No. 5,524,313. A cut edge or surface 9a of the circular buff material 9 corresponds to the abrasive surface 7a of the buff 7. Reference numeral 9b denotes a hole to penetrate therethrough the drive shaft 6.

Figure 10:
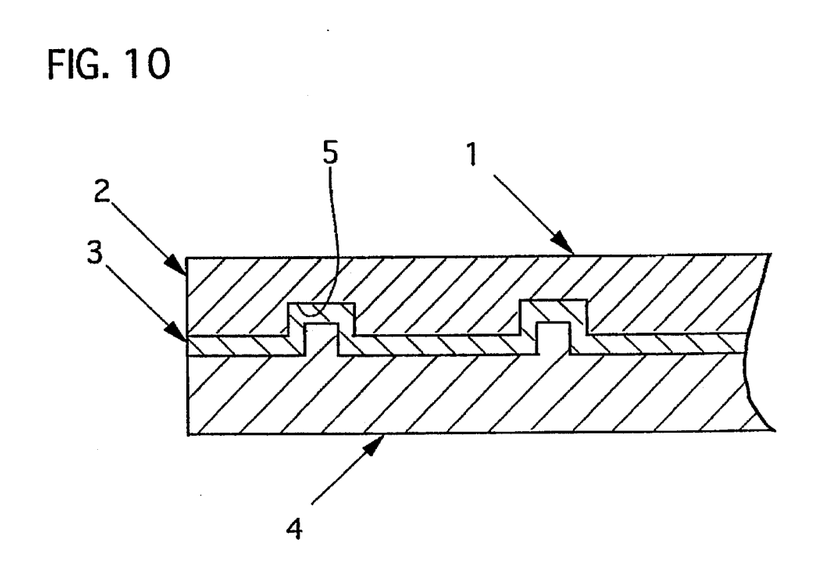
FIG. 10 is a cross sectional view for schematically showing the construction of the compact disc.

FIG. 10 is a cross sectional view which shows schematically the cross section of the compact disc 1. In FIG. 10, the compact disc 1 has a laser-penetratable layer 2 made of synthetic resin. The layer 2 includes the lower surface on which the digital date is recorded as small pits 5. The pits 5 are formed as a spiral. Under the layer 2 is formed a laser-reflectable layer 3 which is made of a aluminum metallic film, for example. In turn under the layer 3 is formed a support layer 4. The layer 4 includes the lower surface on which an information for explaining the contents recorded in the disc 1, for example title of the music, is to be printed.

A reading head (not shown) includes a beam eject element and beam receive element. The beam eject element ejects the laser beam toward the laser-penetratable layer 2 and the beam receive element receives the beam which is reflected by the laser-reflectable layer 3. It has been recognized that the reading head sometimes skip or jump data to be reading due to the damages on the disc laser-penetratable layer2. It has been also recognized that the damages on the layer 2 sometimes let the disc un-readable in the excessive case. To remove such damages, the buff 7 is used to grind or burnish the reading surface of the laser-penetratable layer 2 as described above referring FIG. 8. Apparatus for burnishing or polishing to remove the damages on the disc is also disclosed in U.S. Pat. No. 5,099,618, U.S. Pat. No. 4,179, 852. U.S. Pat. No. 4,586,296 and Japanese Unexamined Patent Publication No. 4-372785.

Figure 11A:
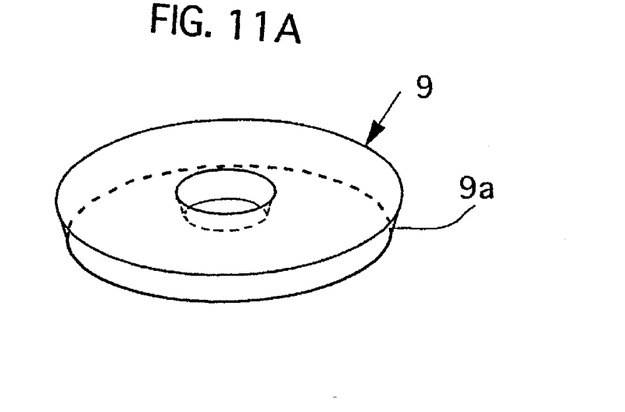
FIG. 11A is a perspective view showing the circular buff material which has slanted end surface.
Figure 11B:
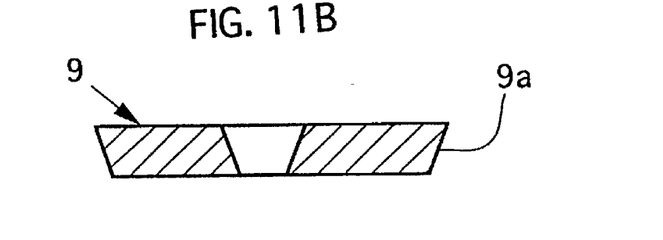
FIG. 11B is a cross sectional view showing the buff material which has slanted end surface.

The sheet material 8 is for example, woven cloth with threads, namely warp and weft. Such sheet material 8 made of cloth inclines to transform or deform during the blanking process due to the lack of rigidity, whereby the cut surface 9a of the circular buff material 9 tends to slant as shown in FIGS. 11A and 11B.

Figure 12A:
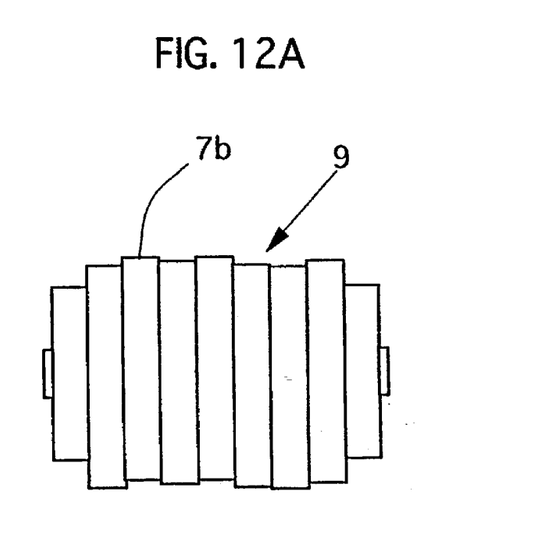
FIG. 12A is a side view showing an example of the irregular surface of the abrasive surface of the buff in which the irregular surface is formed because the &enter of the circular buff materials is not aligned.

The stacking or assembling process of the circular buff material 9 sometimes results in irregular abrasive surface 7a. An example is shown in FIG. 12A where the irregular surface is formed because the centers of the circular buff materials 9 are not aligned. Another example is shown in FIG. 12B where the irregular surface is formed because the circular buff material 9 is transformed due to the pressing force during the assembling process, which press is forged along the length of the buff 7.

Figure 12B:
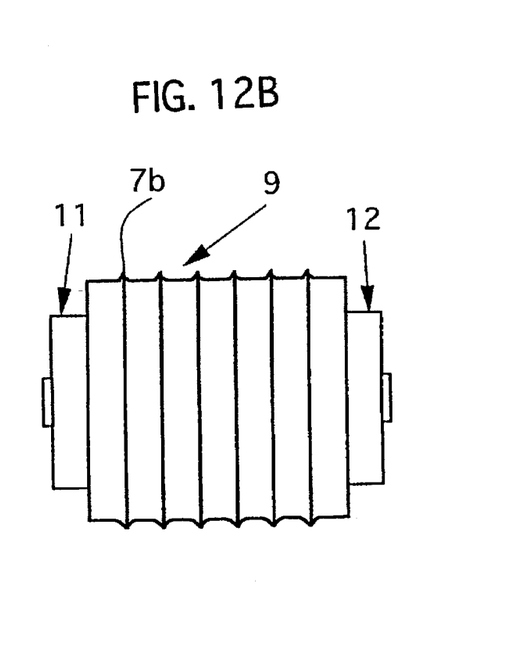
FIG. 12B is a side view showing another example of the irregular surface of the abrasive surface of the buff in which the irregular surface is formed because the circular buff material is transformed due to the pressing force.
Figure 13:
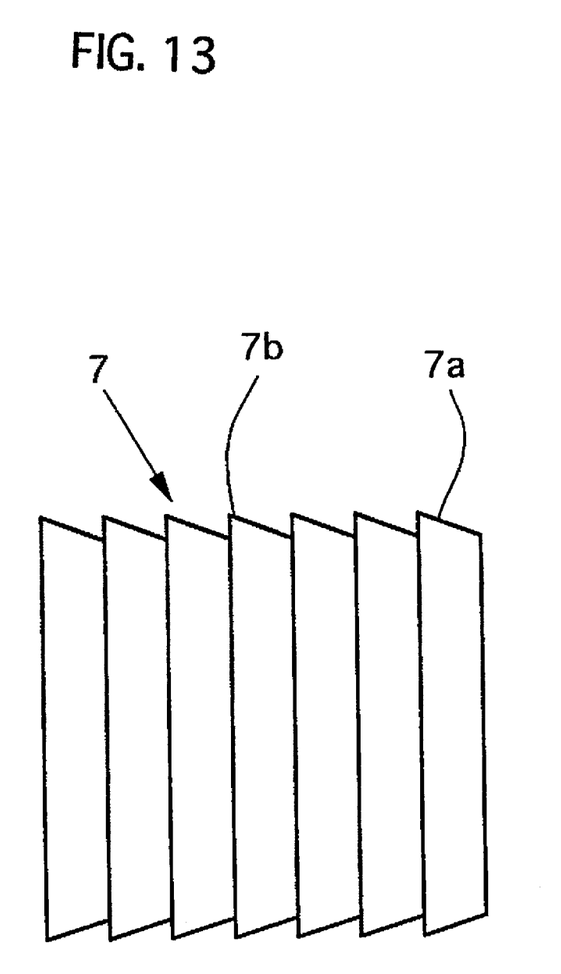
FIG. 13 is a side view showing another example of the irregular surface of the abrasive surface of the buff in which the irregular surface is formed because the circular buff material is transformed during blainking process.

The buff 7 having the irregular abrasive surface with projected portions 7b as shown in FIGS. 12A, 12B and 13 will make the scratches, corresponding to the projected portions 7b, on the surface of the disc.

SUMMARY OF THE INVENTION

It is therefore a general object of the invention to provide the method of smoothing the abrasive surface of the buff.

It is another object of the invention to provide the method of smoothing the abrasive surface of the buff even if the buff is made of the cloth with less rigidity.

In order to achieve above-mentioned object, according to the invention, a method for producing a cylindrical buff with an abrasive surface comprises the steps of: stacking a plurality of circular buff material to form cylindrical shaped buff; soaking said cylindrical buff into a liquid; freezing said liquid soaked in said cylindrical buff; rotating said cylindrical buff; cutting the abrasive surface of said cylindrical buff by a cutting tool to smoothen the abrasive surface.

In addition to the above, according to the invention, a method for producing a cylindrical buff with an abrasive surface comprises the steps of stacking a plurality of circular buff material to form cylindrical shaped buff; rotating said cylindrical buff; jetting a liquid with high speed toward the abrasive surface of said buff to smoothen the abrasive surface.

The buff material is for example, woven cloth or un-woven cloth.

After the stacking step, preferably the plurality of circular buff material being positioned between said two side plates and pressed in the longitudinal direction.

Other objects, features and advantages of the invention will become apparent from the following description of a preferred embodiment of the invention, taken together with the attached drawings thereof.

DETAILED DESCRIPTION OF THE PREFERRED EMBODIMENTS

Referring to the drawings, an embodiment of the inventive method for producing a cylindrical buff will be explained.

Firstly, the sheet material made of cloth is cut to blank out a circular buff material 9 as shown in FIG. 9. Usual sheet material 8 is woven cloth with threads, namely warp and weft. However, any material generally used for the buff can be used as the sheet material 8. The sheet material 8 made of cloth inclines to transform or deform during the blanking process due to the lack of rigidity, whereby the cut surface 9a of the circular buff material 9 slants as shown in FIGS. 11A and 11B. The surface 9a corresponds to an abrasive surface of the buff.

The woven cloth includes threads which inclines to be extracted from the abrasive surface 7a of the buff 7 during the burnishing process. The short pieces of extracted thread will grow to a fluff or lump of the threads and injure the surface of the disc. Thus, after the above burnishing process with the buff made of the woven cloth, the burnished disc will have not the completely glossy surface but "peppered" surface. Even if such surface of the disc may not trouble in reading the date of the disc, the surface is not beautiful. The inventor have found that the buff with un-woven cloth can burnish the disc with glossy, completely beautiful surface. Un-woven cloth is made of fiber web which is not made of threads but mechanically, chemically or thermally treated to adhere the fiber. Therefore, the buff made of such un-woven cloth will not encounter the above problem resulted from the fluff or lump of the threads and the burnished disc 1 will have beautiful, glossy reading surface.

However, un-woven cloth has rigidity less than the woven cloth, whereby the cut surface 9a of the circular buff material 9 tends to slant more than the case of the woven cloth. Accordingly, the inventive method is more suitable for this case.

Figure 2:
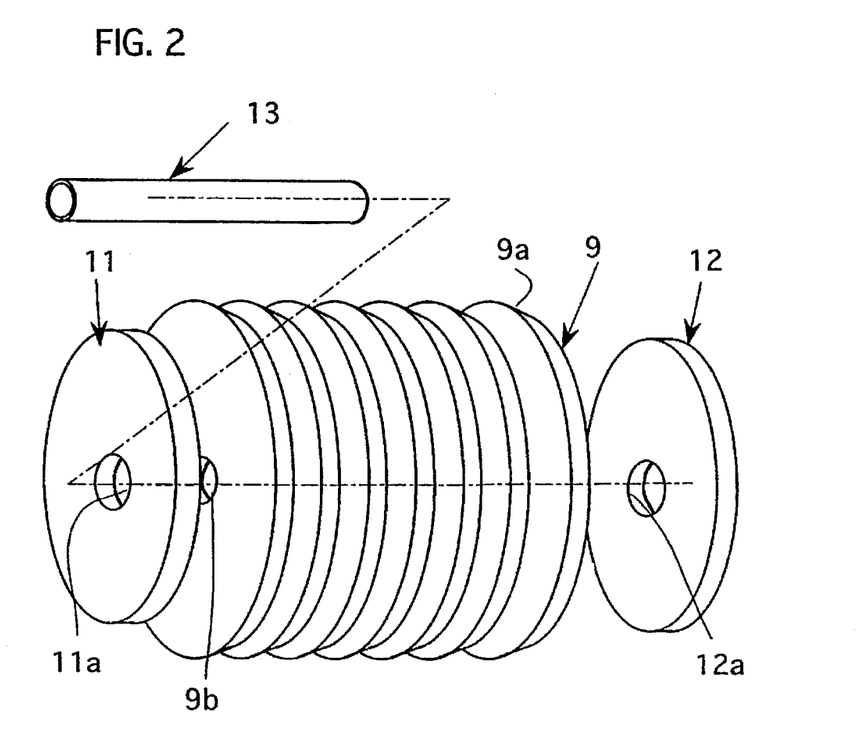
FIG. 2 is a perspective view showing the step of stacking a plurality of circular buff material to form cylindrical shaped buff according to an embodiment of the invention.

FIG. 2 is a perspective view showing the step of stacking a plurality of circular buff material 9 to form a cylindrical shaped buff.

After the blanking process, the plurality of circular buff material 9 is stacked to form cylindrical shaped buff as shown in FIG. 2. Reference numerals 11,12 denote side plates made of synthetic resin or metal. Each plates 11,12 has a hole 11a,12a. Two side plates 11,12 are put at right and left sides of a plurality of circular buff material 9, respectively. A tube 13 made of metal, for example aluminum, penetrates the holes 11a,12a of the plates 11,12 and the holes 9b of the circular buff materials 9.

Figure 3:
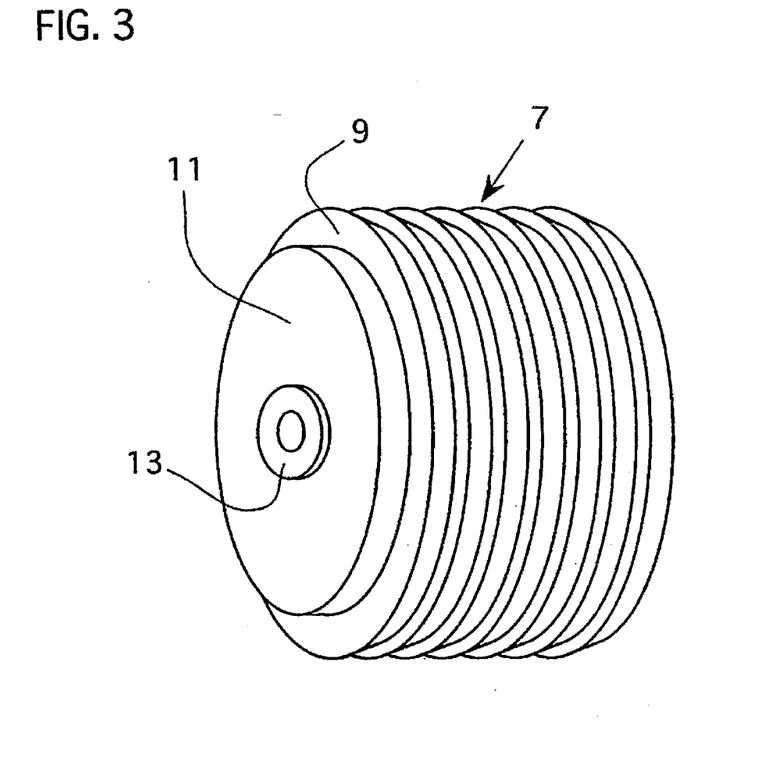
FIG. 3 is a perspective view showing the step of assembling the circular buff material, side plates and cylindrical tube integrally.

FIG. 3 is a perspective view showing the step of assembling the circular buff materials 9 and other members 11, 12 and 13.

After the stacking process, two side plates 11,12 are forced toward each other to press the plurality of circular buff material 9 and the both ends of the tube 13 are caulking to fix itself to the side plates 11,12. Thus, the plurality of circular buff material 9, side plates 11,12 and tube 13 are assembled integrally.

The embodiment is applicable not only to the circular buff material 9 with inclined abrasive surface 9a resulted from blanking process but also to the circular buff material 9 having the abrasive surface which is irregular resulting from other reasons as shown in FIGS. 12A, 12B to smoothen the abrasive surface. FIG. 12A shows the irregular surface which is formed because the center of the circular buff materials is not aligned, FIG. 12B shows the irregular surface which is formed because the circular buff material is transformed due to the pressing force. As described above, the buff 7 having the irregular abrasive surface with projected portions 7b will make the scratches, corresponding to the projected portions 7b, on the surface of the disc.

Of course the embodiment is applicable not only to the circular buff material 9 made of very easily transformed material such as un-woven cloth but also to the circular buff material 9 made of usual woven cloth with warp and weft. In addition to, animal skin and any other buff material can be used for this embodiment.

Figure 4:
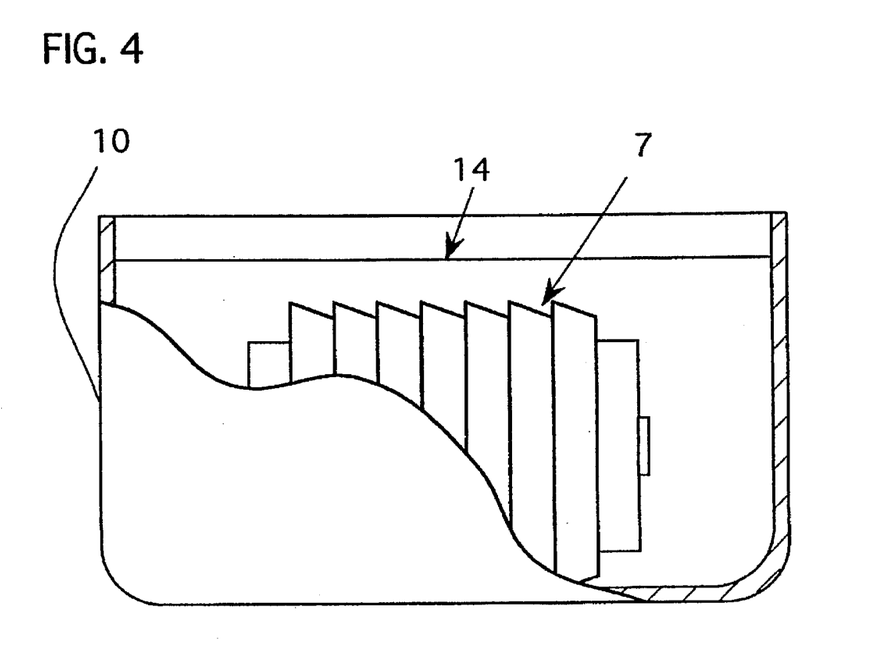
FIG. 4 is a side view showing a step of soaking the cylindrically shaped buff in a liquid and letting the liquid permeating the cylindrical buff according to an embodiment of the invention.

FIG. 4 shows an example of soaking process. The buff 7 cylindrically formed as above-mentioned, is soaked in a liquid 14. The liquid 14 is preferably easy to be frozen, for example water. FIG. 4 shows an example in which the buff 7 is in a container 10 filled with the liquid 14. Of course any other way in which the liquid 14 permeates the abrasive surface of the cylindrical buff 9 can be taken.

Figure 1A:
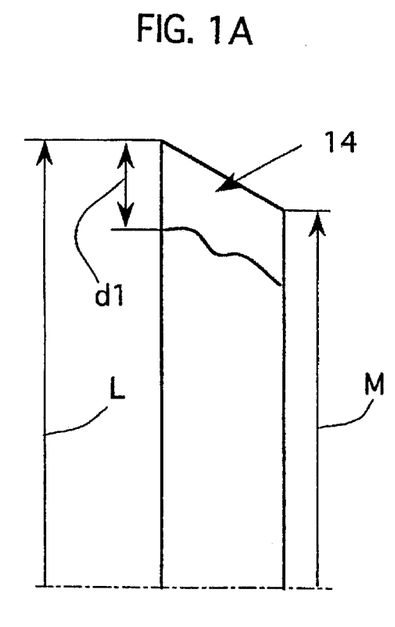
FIG. 1A is a cross sectional view showing the liquid permeating the buff, in the case of buff being made of the material which is easy for the liquid to permeate.
Figure 1B:
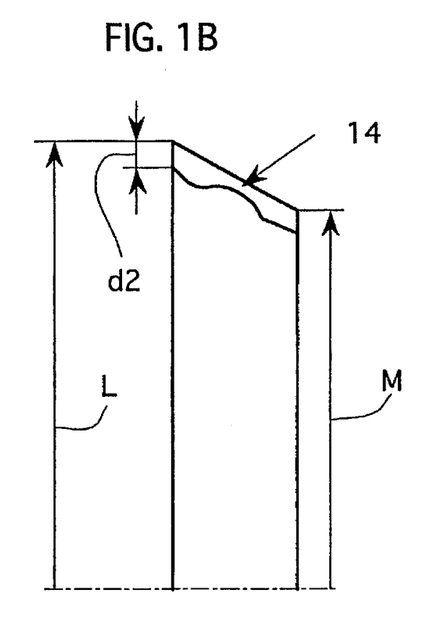
FIG. 1B is a cross sectional view showing the liquid permeating the buff, in the case of buff being made of the material which is not easy for the liquid to permeate.

FIGS. 1A and 1B are cross sectional views showing the liquid 14 permeating the buff. In these FIGS., permeating depth of the liquid 14 is denoted as d1, d2, maximum and minimum radius of the buff 7 or buff material 9 are denoted as L and M, respectively. In the case of buff material 9 made of un-woven cloth, the liquid 14 can rather rapidly permeate the buff material 9 and it is easy for the liquid 14 to reach and exceed the minimum radius M in all area of the abrasive surface 9a of the buff material 9. On the other hand, in the case of buff material 9 made of the material which is not easy for the liquid 14 to permeate, for example acrylic resin, it is not easy for the liquid 14 to reach the minimum radius M in all area of the abrasive surface of the buff material 9.

The buff 7 with permeated liquid 14 is then refrigerated until the liquid 14 is in solid state. As a result, the portion of buff material 9 in which the liquid 14 permeated has high rigidity.

Figure 5:
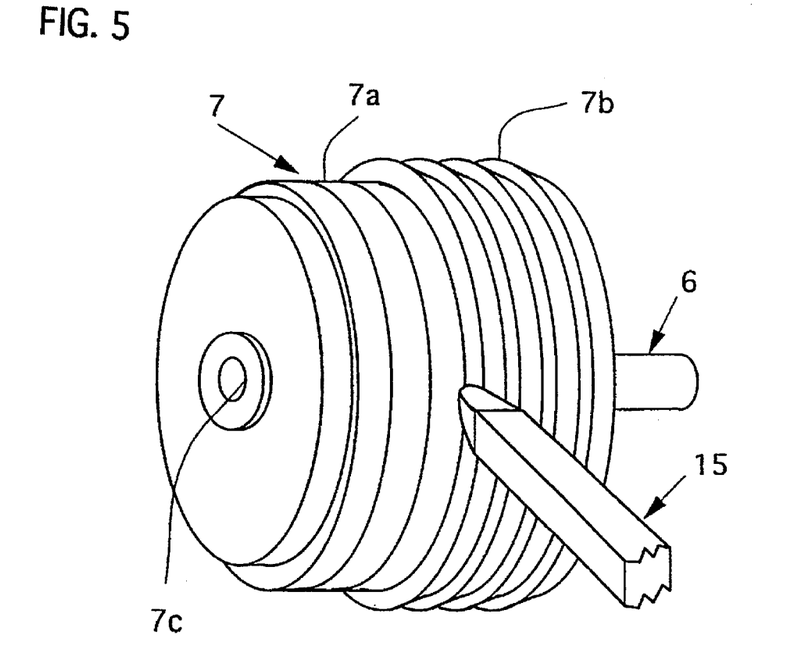
FIG. 5 is a perspective view showing the step of cutting the surface of the rotating buff according to an embodiment of the invention.

FIG. 5 is a perspective view showing the step of cutting the surface of the rotating buff according to an embodiment of the invention. After the freezing step, a drive shaft 6 is penetrated through a hole 7c of the buff 7 as shown in FIG. 5. The buff 7 is rotated by a drive a source (not shown) and cut the abrasive surface 7a by a tool 15 of a lathe (not shown). Due to the rigidity of the surface 7a the cutting can be easily performed.

If the liquid 14 is so deeply permeated the buff material 9 as shown in FIG. 1A, the buff material 9 can be cut without transformation of the abrasive surface 7a even if the buff material 9 is cut till the radius of the buff material 9 being slightly less than the minimum radius M and the abrasive surface 7a can be smoothly or evenly cut. Accordingly, the above-mentioned soaking process, freezing process and cutting process are only one time performed, respectively.

On the other hand, if the liquid 14 is so shallowly permeated the buff material 9 as shown in FIG. 1B, the abrasive surface 7a of the buff material 9 will transform because of the force urged by the tool 15 upon the cutting amount exceeds the permeating depth d2 and the abrasive surface 7a can not be evenly cut. Accordingly, the above-mentioned soaking process, freezing process and cutting process are repeatedly performed, respectively until the abrasive surface 7a can be smoothly cut.

Figure 6:
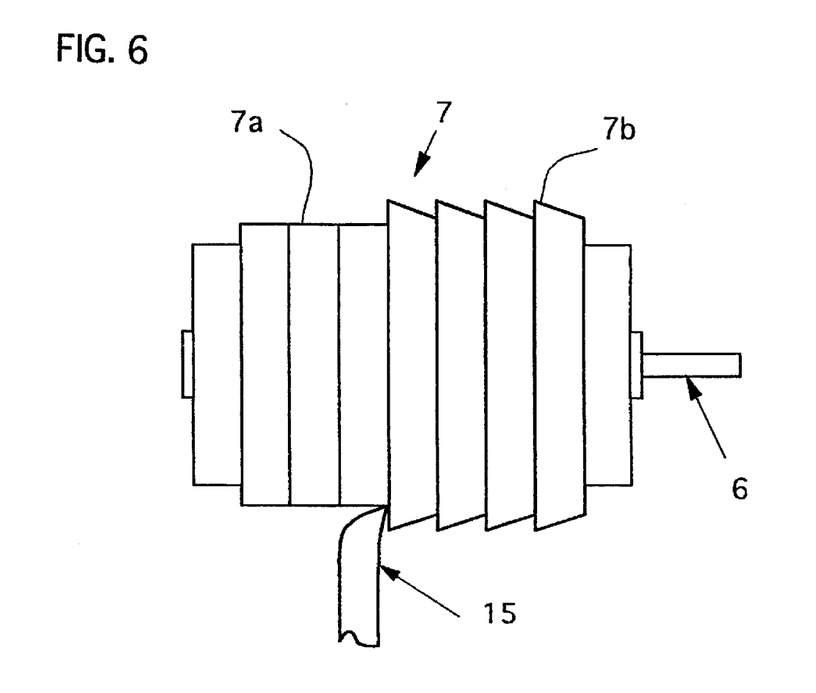
FIG. 6 is a side view showing the step of cutting the surface of the rotating buff according to an embodiment of the invention.

Thus, by the cutting process, the abrasive surface 7a is cut by the tool 15 until the uneven portion or the projected portions 7b of the buff material 9 are removed owing to the rigidity of the abrasive surface 7a of the buff 7.

Another embodiment of the inventive method for producing a cylindrical buff will be explained.

A plurality of circular buff material 9 is shaped from the sheet material 8 by blanking process, stacking process and assembling process to form cylindrical shaped buff 7 as in the first embodiment described above and shown in FIGS. 2, 3 and 9.

Figure 7:
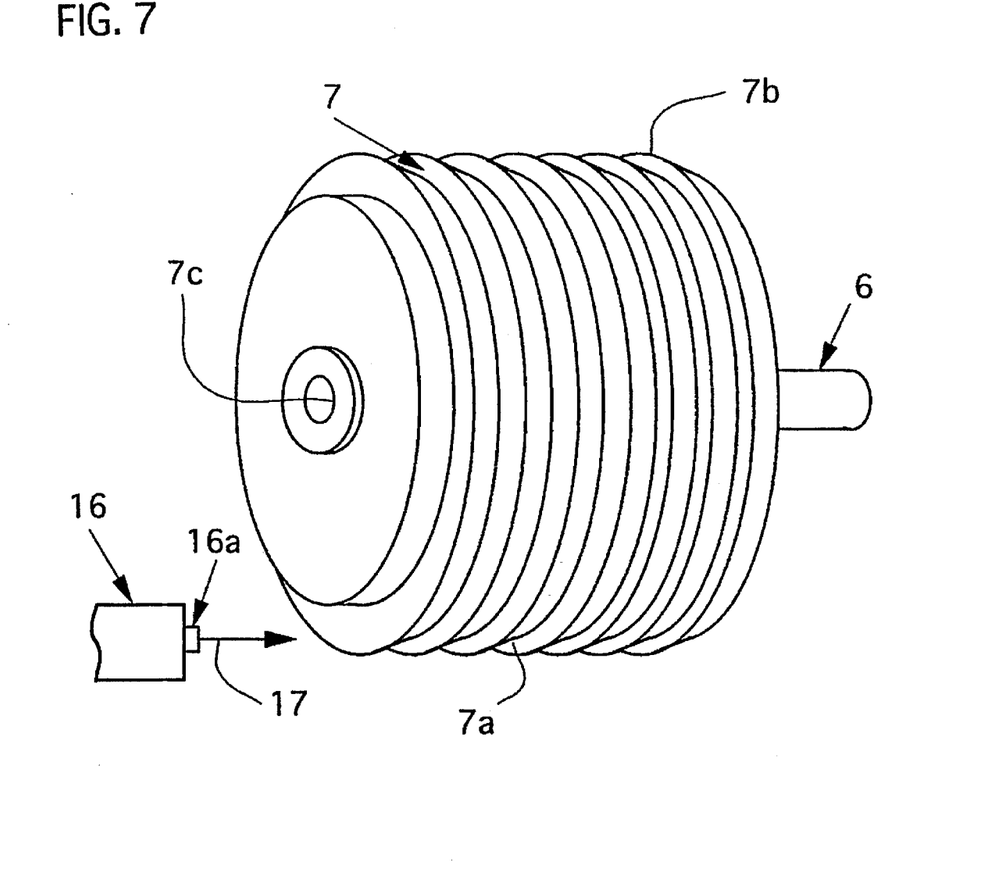
FIG. 7 is a perspective view showing the step of cutting the surface of rotating buff by the water-jet according to another embodiment of the invention.

After then, a drive shaft 6 is penetrated through a hole 7c of the buff 7 as shown in FIG. 7. Then the buff 7 is rotated by a drive source (not shown.) A water-jet ejecting apparatus 16 is situated so that a jetting hole 16a thereof faces the abrasive surface 7a of the buff 7 and jets water in the direction along the surface 7a. The buff 7 is rotated by a driving source (not shown) while the water-jet ejecting apparatus 16 ejects a liquid 17 with high speed and high pressure. Due to the collision with the liquid 14, the abrasive surface 7a of the buff 7 will be cut and flatten. Even if the buff material 9 is so easily transform that the abrasive surface 7a can not be easily flattened by using the tool of the lathe, the smooth surface 7a can easily be obtained by using the water-jet ejecting apparatus 16.

As same as the first embodiment, the second embodiment is applicable not only to the circular buff material 9 with inclined abrasive surface 9a resulted from blanking process but also to the circular buff material 9 with the abrasive surface which is irregular resulting from other reasons, and the second embodiment is applicable not only to the circular buff material 9 made of very easily transformed material such as un-woven cloth but also to the circular buff material 9 made of usual woven cloth with warp and weft. In addition to, animal skin and any other buff material can be used for this embodiment.

The invention is not limited to the above-mentioned embodiments and the above-mentioned embodiments can be modified within the gist of the invention.

What is claimed is:

1. A method for producing a cylindrical buff with an abrasive surface comprising the steps of:

stacking a plurality of circular buff material to form cylindrical shaped buff;

soaking said cylindrically shaped buff into a liquid;

freezing said liquid soaked in said cylindrical buff; and rotating said cylindrical buff and cutting the abrasive surface of said cylindrical buff by a cutting tool to smoothen the abrasive surface.

2. The method according to claim 1 wherein said buff material is un-woven cloth.

3. The method according to claim 1 wherein said buff material is woven cloth.

4. The method according to claim 1 further comprising the step of assembling said cylindrical buff and two side plates after said stacking step, said plurality of circular buff material being positioned between said two side plates and pressed in the longitudinal direction.

5. A method for producing a cylindrical buff with an abrasive surface comprising the steps of:

stacking a plurality of circular buff material to form cylindrical shaped buff; and rotating said cylindrical buff and jetting a liquid with high speed toward the abrasive surface of said buff to smoothen the abrasive surface.

6. The method according to claim 5 wherein said buff material is un-woven cloth.

7. The method according to claim 5 wherein said buff material is woven cloth.

8. The method according to claim 5 further comprising the step of assembling said cylindrical buff and two side plates after said stacking step, said plurality of circular buff material being positioned between said two side plates and pressed in the longitudinal direction.

* * * * *